UNITED STATES PATENT OFFICE.

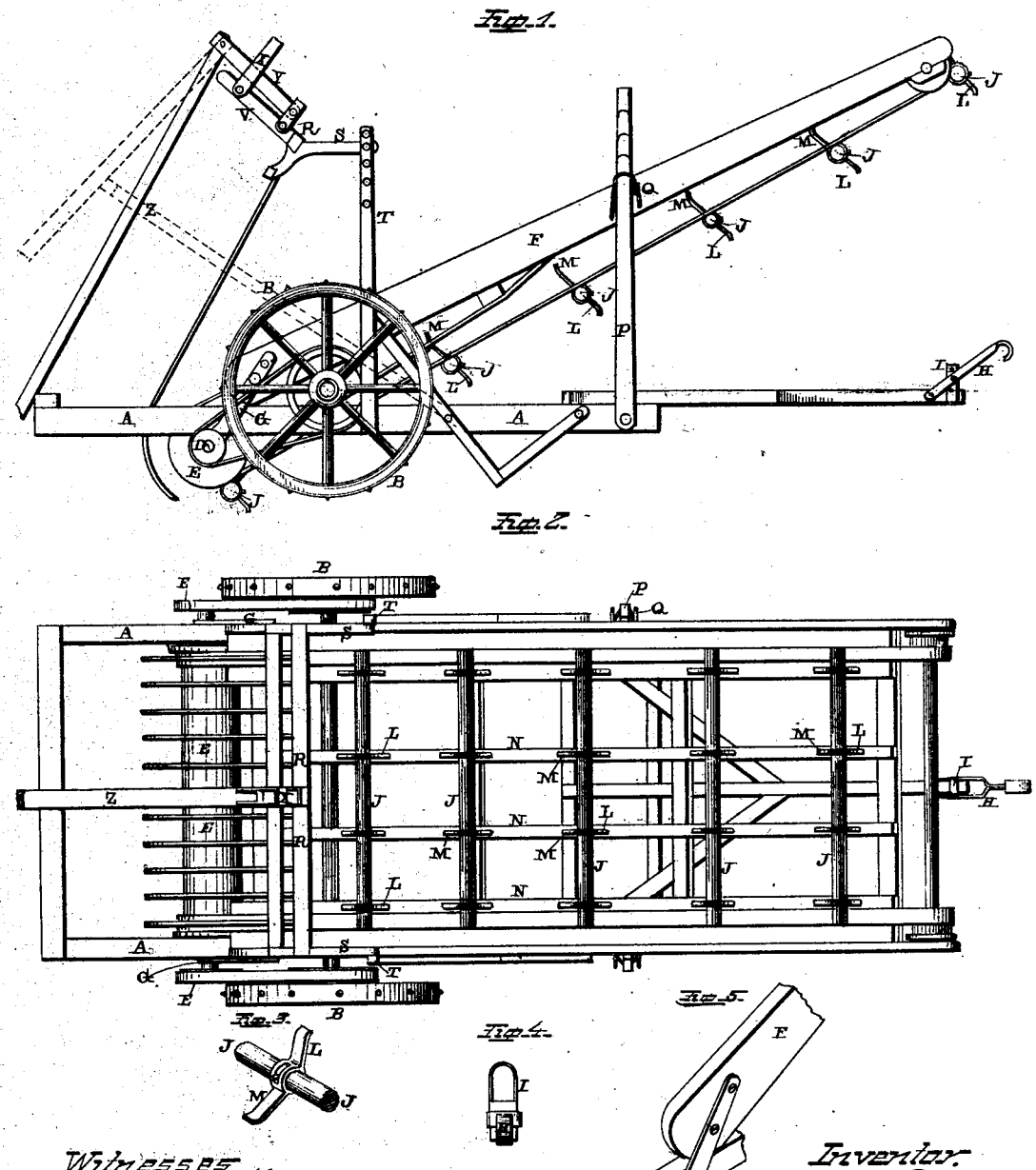

DAVID W. BOVEE, OF RICHLAND CENTRE, WISCONSIN.

HAY LOADER AND RAKER.

SPECIFICATION forming part of Letters Patent No. 236,979, dated January 25, 1881.

Application filed September 30, 1880. (No model.)

*To all whom it may concern:*

Be it known that I, DAVID W. BOVEE, of Richland Centre, in the county of Richland and State of Wisconsin, have invented certain new and useful Improvements in Hay Loaders and Rakers; and I do hereby declare the following to be a full, clear, and exact description of the invention, such as will enable others skilled in the art to which it pertains to make and use it, reference being had to the accompanying drawings, which form part of this specification.

My invention relates to an improvement in hay loaders and rakers; and it consists, first, in securing the slats of the hay-carrier directly to the endless bands or straps, and providing each tooth that is attached to the slats with a slot, so that each one has an independent movement of its own upon the slat, which movement is limited by a slot in the tooth and a pin projecting from the slat through the slot, so that after the teeth have reached the upper end of the elevating-frame they can turn backward of their own weight, and thus not pull any part of the hay that is being elevated upon the wagon down with them; second, in securing an arm or lever to each end of the rake-head, and having these arms or levers project a suitable distance forward in advance of the rake-head, where they are pivoted to standards which project up above the top of the carrier-frame, whereby the teeth are pivoted in front of the lower pulleys and made to rake much better on rough land, at the same time that the teeth are held farther from the elevator, thus giving much more room for the hay to pass under the rake-shaft, so as to rake heavy hay or windrows with greater ease, and at the same time avoid the bending of the teeth; third, in an arm or lever which projects backward from the rake-head, and which arm or lever is provided with suitable bands or keepers, in which is pivoted a lever, which lever has fastened to its rear end the regulating rod or handle, whereby, after the rake-teeth have been adjusted into position, they can automatically drop down into furrows or recesses in the ground and then readjust themselves, whereby all hollows and recesses can be raked as thoroughly as the level ground.

The object of my invention is to produce a hay-loader in which the rake-teeth are given a greater freedom of movement than has heretofore been the case, so that they will rake the hay from hollows and ditches, and the rake-teeth be made much less liable to get bent.

Figure 1 is a side elevation of my invention. Fig. 2 is a plan view of the same. Fig. 3 is a perspective of one of the teeth. Fig. 4 is an end view of the hook for fastening the loader to wagons. Fig. 5 is a perspective of the fastening of the lower part of the elevator-frame.

A represents a main frame, upon which the elevator and raker is secured, and which frame may be of any suitable construction. The driving-wheels B are journaled upon the top of this frame, and formed on the inner side of one or both of these wheels is a pulley, from which the belt passes over the pulley D on the end of the lower roller or cylinder, E.

This hay-loader is attached to a wagon in front by means of the adjustable hook H, which is pivoted at its rear end, and which can be raised and lowered to any desired angle. Secured to the tongue of the main frame A, inside of this hook H, is a bent perforated strap, I, which has a series of holes made through it in such relation to each other that the pin or bolt can be passed through this hook and strap, and thus hold the hook at any desired elevation. The adjustment of this hook H is a great convenience, for the hay-loader can be adjusted to wagons of different heights without altering the positions of the rake-teeth, which is a very essential feature where a number of wagons are used with one hay-loader.

The elevating-frame F has secured to its lower end suitable bands or straps, G, which project backward and downward, and have their lower ends pivoted upon projections upon the side of the boxing, or upon the ends of the cylinder shaft or journals, as shown, by which means the elevator-frame can be raised and lowered to any desired angle without the belts being made either tighter or looser. Where this elevator-frame is not pivoted upon the journals of the roller that drives the belt, or in a line with these journals, as here shown, each time that the frame is adjusted, either up or down, the elevating-belts are either tightened or loosened, and thus the effectiveness of the carrier greatly interfered with.

The slats of the hay-carrier are secured tightly to the elevating-belts, and each slat J will be made preferably round, as shown, and have the teeth L made with openings through them, so as to pass over the slats. Each tooth L has a slot of suitable length made through it for a pin or fastening-screw to pass through into the slat, so that each one will have an independent movement of its own, whereby, when the slat reaches the top of the frame, each tooth can drop backward, from its own weight or gravity, and thus free itself from the hay which is being elevated upon the wagon without pulling any of the hay downward over the top of the elevator, as is the case where both teeth and slats are made rigid in the usual manner. Each tooth has a brace, M, projecting from its rear end, so as to bear on the longitudinal bottom piece, N, of the elevator-frame, and a hooked portion for carrying up the hay. The brace part M, catching against the bottom piece of the frame, holds the hooks rigidly in position until the slat has reached the upper part of the carrier, when each tooth is left free to drop backward, as described. As the hooks are made shorter and lighter than the brace M, and as each tooth is loosely attached to its slat and has a rotary movement the length of the slot made in it, it will readily be seen that the hooks will drop backward, of their own weight, as soon as they reach the top end of the frame.

The elevator-frame F is supported in any desired position by means of the two supports P, which are secured to the front end of the main frame A, the frame being provided with spring-hooks Q, to catch in the notches made in the outer sides of the standards. When the frame is pushed upward from a lower notch the hooks automatically catch in the upper notches as soon as they reach them; but if it is desired to lower the frame it is necessary to open the hooks outward, so as to free them from the notch in which they have already caught.

Secured to each end of the rake-head R is an arm or lever, S, which projects a suitable distance forward in advance of the rake-head, and are pivoted at their front ends upon the standards T, which have a series of holes made through them, so that the rake-head can be adjusted up and down, as occasion may require. These levers or arms are here shown as attached to the standards; but, if so preferred, they may be pivoted to the main frame itself, or to the carrier-frame. By the use of these arms or levers the rake-teeth are pivoted much farther in advance of the lower pulleys than can be done without them, and cause the machine to rake much better on rough land than where these levers are not used. Another advantage gained is, that the teeth are held much farther back from the rear end of the elevator, thus giving much more room for the hay to pass under the rake-head, which enables heavy hay or windrows to be carried up much more easily. Much shorter teeth can also be used, and thus avoid the constant bending which occurs where very long teeth are used.

Projecting upward and backward from the rake-head is a rigid brace or lever, V, to which lever are secured the two U-shaped straps or guides X, the strap next to the head being the shorter one of the two. In this shorter and inner strap or guide is pivoted the lever Y, which extends backward over the top of the rigid brace or lever through the rear guide, and has the regulating rod or lever Z pivoted to it. As this rod or lever Y is pivoted at its inner end and bears down upon the top of the rigid brace or lever V, it is evident that after the rake-teeth have been adjusted in position they cannot rise upward, because the rigid brace or lever is held in position by means of the rod or lever Y upon its top. As the machine is drawn along, should the teeth come to a ditch, hollow, recess, or furrow in the ground, the rake-teeth can automatically drop downward the full length of the outer strap or guide, through which the pivoted lever Y passes, and as soon as the teeth come upon solid ground again their lower ends will be raised upward until the rigid brace or lever V can bear upward against the under side of the pivoted lever Y. By thus using the rigid brace or arm V and a pivoted lever, Y, and connecting the two together by suitable guides or keepers, the rake is given an automatic adjustment which enables it to rake where the teeth would not otherwise touch when constructed in the usual manner.

Instead of fastening the lever Z upon the rear end of the frame A, as shown in solid lines in Fig. 1, it may be fastened upon a cross-bar that is supported upon a brace at each end, as shown in dotted lines.

Having thus described my invention, I claim—

1. In a hay-rake and loader, the combination of the endless belts N, round slats J, secured tightly thereto and provided with a pin for each tooth, the teeth L, having holes through them, so as to pass over the slats, slots for the pins to pass through, and each tooth being provided with a brace, M, for holding the tooth in position, whereby the teeth are automatically made to release themselves from the hay after reaching the top of the elevator, substantially as shown.

2. In a hay-loader, the combination of the rake-head, a rigid arm or brace secured thereto and provided with suitable guides or keepers, with a lever which is pivoted in one of the guides and has the adjusting-rod pivoted to its rear end, whereby the rake-teeth can automatically drop down into ditches or furrows in the ground, substantially as shown.

3. A rake-head provided with an arm or lever at each end, which arm projects forward a suitable distance at its front end, with a rigid arm or brace, V, suitable guides or keepers secured thereto, a pivoted arm or lever, Y, and the adjusting-rod Z, the parts being combined and arranged to operate as described.

In testimony that I claim the foregoing I have hereunto set my hand this 20th day of September, 1880.

DAVID WM. BOVEE.

Witnesses:
 WM. H. PALMER,
 LEROY D. LEATHERBERRY.